US011247147B2

(12) United States Patent
Sundström et al.

(10) Patent No.: US 11,247,147 B2
(45) Date of Patent: *Feb. 15, 2022

(54) PURIFICATION OF OIL

(71) Applicant: RECONDOIL SWEDEN AB, Östersund (SE)

(72) Inventors: Fred Sundström, Östersund (SE); Thomas Persson, Östersund (SE)

(73) Assignee: RECONDOIL SWEDEN AB, Östersund (SE)

( * ) Notice: Subject to any disclaimer, the term of this patent is extended or adjusted under 35 U.S.C. 154(b) by 189 days.

This patent is subject to a terminal disclaimer.

(21) Appl. No.: 16/607,878

(22) PCT Filed: Apr. 24, 2018

(86) PCT No.: PCT/SE2018/050416
§ 371 (c)(1),
(2) Date: Oct. 24, 2019

(87) PCT Pub. No.: WO2018/199838
PCT Pub. Date: Nov. 1, 2018

(65) Prior Publication Data
US 2020/0061498 A1    Feb. 27, 2020

(30) Foreign Application Priority Data
Apr. 28, 2017    (SE) .................................... 1750511-6

(51) Int. Cl.
*B01D 17/02* (2006.01)
*B01D 17/04* (2006.01)
(Continued)

(52) U.S. Cl.
CPC ......... *B01D 21/01* (2013.01); *B01D 17/0214* (2013.01); *B01D 17/047* (2013.01);
(Continued)

(58) Field of Classification Search
CPC .. B01D 21/01; B01D 17/0214; B01D 17/047; B01D 17/12; B01D 21/0012;
(Continued)

(56) References Cited

U.S. PATENT DOCUMENTS 3,069,017 A * 12/1962 Colby .................... B01D 27/02
210/484
3,097,157 A    7/1963 Accountius
(Continued)

FOREIGN PATENT DOCUMENTS

CA    2 730 467 A1    8/2012
WO    95/14752 A1    6/1995
(Continued)

*Primary Examiner* — Joseph W Drodge
(74) *Attorney, Agent, or Firm* — Dilworth & Barrese, LLP (57) ABSTRACT

A system (1; 101) and a method for purification of oil, said system comprising:—at least one feed tank (3) comprising oil to be purified;—a separation aid dosing device(13);—at least one basic sedimentation tank (21*a*, 21*b*) comprising at least one inlet (23*a*, 23*b*) connected to the feed tank (3) and to the separation aid dosing device (13) for receiving oil to be purified and separation aid, said at least one basic sedimentation tank (21*a*, 21*b*) further comprising at least one sludge phase outlet (41*a*, 41*b*) provided in a bottom part (37*a*, 37*b*) of the basic sedimentation tank and at least one oil phase outlet (39*a*, 39*b*);—at least one advanced sedimentation tank (121) comprising at least one sludge phase inlet (122) connected to the at least one sludge phase outlet (41*a*, 41*b*) of the at least one basic sedimentation tank (21*a*, 21*b*), said advanced sedimentation tank (121) further comprising at least one sludge phase outlet (141; 141*a*, 141*b*) connected to a sludge tank (143) and at least one oil phase outlet (139*a*, 139*b*; 39), wherein said advanced sedimentation tank (121) further comprises at least one sensor (55;
(Continued)

55a, 55b, 55c) for detecting the presence of an oil phase or a sludge phase.

19 Claims, 3 Drawing Sheets

(51) Int. Cl.
| | | |
|---|---|---|
| *B01D 17/12* | (2006.01) | |
| *B01D 21/00* | (2006.01) | |
| *B01D 21/02* | (2006.01) | |
| *B01D 21/30* | (2006.01) | |
| *B01D 21/34* | (2006.01) | |
| *C10G 33/04* | (2006.01) | |
| *C10G 33/06* | (2006.01) | |
| *C10G 33/08* | (2006.01) | |
| *B01D 21/01* | (2006.01) | |

(52) U.S. Cl.
CPC ......... *B01D 17/12* (2013.01); *B01D 21/0012* (2013.01); *B01D 21/02* (2013.01); *B01D 21/302* (2013.01); *B01D 21/34* (2013.01); *C10G 33/04* (2013.01); *C10G 33/06* (2013.01); *C10G 33/08* (2013.01); *C10G 2300/208* (2013.01)

(58) Field of Classification Search
CPC ...... B01D 21/02; B01D 21/302; B01D 21/34; B01D 21/009; B01D 21/32; B01D 21/0093; B01D 21/30; B01D 17/0202; B01D 17/0208; B01D 21/10; B01D 21/24; B01D 21/2405; C10G 33/04; C10G 33/06; C10G 33/08; C10G 2300/208; C10M 175/0008; C10M 175/0016; C10M 175/005; C02F 11/00; C02F 11/002; C02F 11/12
See application file for complete search history.

(56) References Cited

U.S. PATENT DOCUMENTS

| | | | | |
|---|---|---|---|---|
| 4,170,553 | A * | 10/1979 | Lang | B01D 21/01 137/3 |
| 4,226,714 | A | 10/1980 | Furness et al. | |
| 4,272,359 | A * | 6/1981 | Owen | C10B 53/00 196/46 |
| 5,587,065 | A * | 12/1996 | Burns | B01D 21/0012 210/104 |
| 9,840,895 | B1 * | 12/2017 | Kuhn | E21B 47/04 |
| 2009/0078632 | A1 * | 3/2009 | Gallo | C02F 9/00 210/178 |
| 2011/0024259 | A1 * | 2/2011 | Wallace | C10G 21/00 196/46 |
| 2011/0024329 | A1 | 2/2011 | Wallace et al. | |
| 2016/0304805 | A1 | 10/2016 | Wase et al. | |
| 2017/0333814 | A1 * | 11/2017 | Yancy | B01D 17/0217 |
| 2020/0056102 | A1 * | 2/2020 | Sundstrom | C10G 33/08 |
| 2021/0101094 | A1 * | 4/2021 | Sundstrom | B01D 21/0093 |

FOREIGN PATENT DOCUMENTS

| | | |
|---|---|---|
| WO | 2005/111181 A1 | 11/2005 |
| WO | 2016/049665 A2 | 3/2016 |

* cited by examiner

PURIFICATION OF OIL

TECHNICAL FIELD OF THE INVENTION

The present invention relates to a method and a system for purification of oil.

BACKGROUND OF THE INVENTION

Purification of contaminated oils, such as for example mineral oil, industrial oils, processing oils or hydraulic oils, is important for the possibility to reuse the oils and therefore an important factor for the environmental future and the limited nature resources of oils. The contaminated oil can be purified, or recovered, by means of a liquid two-phase separation process, wherein a liquid separation aid is added to the oil and mixed therewith. Impurities will be captured by the separation aid and will accumulate in a bottom phase.

There is still a need to improve the purification process for contaminated oils.

SUMMARY

It is an object of the present invention to provide an improved method and system for the purification of contaminated oils.

This is achieved in a method and a system and a computer program according to the independent claims.

Hereby systems for purification of oil of different capacity can be provided. The number of basic sedimentation tanks can be varied depending on wanted capacity and often only one advanced sedimentation tank would be needed. Hereby costs can be saved and flexibility with regard to capacity is improved. Furthermore waste of oil can be kept to a minimum.

In one aspect of the invention a system for purification of oil is provided. Said system comprises:
- at least one feed tank comprising oil to be purified;
- a separation aid dosing device;
- at least one basic sedimentation tank comprising at least one inlet connected to the feed tank and to the separation aid dosing device for receiving oil to be purified and separation aid, said at least one basic sedimentation tank further comprising at least one sludge phase outlet provided in a bottom part of the basic sedimentation tank and at least one oil phase outlet;
- at least one advanced sedimentation tank comprising at least one sludge phase inlet connected to the at least one sludge phase outlet of the at least one basic sedimentation tank, said advanced sedimentation tank further comprising at least one sludge phase outlet connected to a sludge tank and at least one oil phase outlet, wherein said advanced sedimentation tank further comprises at least one sensor for detecting the presence of an oil phase or a sludge phase.

In another aspect of the invention a method is provided for purification of oil in a system comprising at least one basic sedimentation tank and at least one advanced sedimentation tank, said method comprising:
- providing separation aid and oil to be purified to at least one basic sedimentation tank;
- waiting for allowing a sludge phase to sediment to a bottom part of the basic sedimentation tank, said sludge phase comprising the separation aid and impurities from the oil;
- removing the oil phase from the basic sedimentation tank;
- transferring the sludge phase from the basic sedimentation tank to the at least one advanced sedimentation tank;
- waiting for allowing a sludge phase to sediment to a bottom part of the advanced sedimentation tank, said sludge phase comprising the separation aid and impurities from the oil;
- detecting by at least one sensor provided in the advanced sedimentation tank the presence of an oil phase or a sludge phase in at least one position in the advanced sedimentation tank;
- removing the oil phase from the advanced sedimentation tank in dependence of the detection.

In still another aspect of the invention a computer program product is provided. Said computer program comprising instructions which, when executed in a processor in a control system in a system for purification of oil, cause the control system to perform the method according to the invention.

In one embodiment of the invention said advanced sedimentation tank comprises a sensor provided at substantially the same level in the advanced sedimentation tank as an oil phase outlet of the advanced sedimentation tank and said sensor is configured for detecting if it is an oil phase or a sludge phase at this level in the advanced sedimentation tank.

In one embodiment of the invention the step of detecting comprises detecting if it is an oil phase or a sludge phase at substantially the level in the advanced sedimentation tank where an oil phase outlet is provided.

Hereby it can be assured that only oil phase is transferred out through the oil phase outlet of the advanced sedimentation tank.

In one embodiment of the invention the advanced sedimentation tank comprises at least three sensors, wherein one sensor is provided at a position within the advanced sedimentation tank such that it will always be provided in the sludge phase, one sensor is provided at substantially the same level within the advanced sedimentation tank as an oil phase outlet and one sensor is provided at a position within the advanced sedimentation tank such that it will always be provided in the oil phase. Hereby reference values for sensor outputs for sludge and oil phase are always available.

In one embodiment of the invention said at least one oil phase outlet in the at least one basic sedimentation tank is provided at a position within the basic sedimentation tank such that a certain percentage of the content in the basic sedimentation tank can be removed from the basic sedimentation tank through the oil phase outlet leaving the rest of the content in a bottom part of the basic sedimentation tank unaffected, the position of the oil phase outlet being chosen such that substantially no sludge phase will be removed from the basic sedimentation tank through the oil phase outlet.

In one embodiment of the invention the step of removing the oil phase from the basic sedimentation tank comprises removing a certain percentage of the content in the basic sedimentation tank from the basic sedimentation tank leaving the rest of the content in a bottom part of the basic sedimentation tank unaffected, whereby substantially no sludge phase will be removed from the basic sedimentation tank together with the removed oil phase.

Hereby it can be assured that only oil phase is removed from the basic sedimentation tanks through the oil phase outlets.

In one embodiment of the invention the system further comprises:

a control system connected to sensors, pumps and valves in the system and configured for controlling flows in the system in dependence of sensor signals, predefined settings and possibly also user input, wherein said control system is configured for controlling a removal of an oil phase from the at least one basic sedimentation tank after sedimentation of a sludge phase to a bottom part of the basic sedimentation tank, said sludge phase comprising the separation aid together with impurities from the oil, said control system further being configured for controlling transfer of the rest of the content in the basic sedimentation tank comprising the sludge phase to the at least one advanced sedimentation tank.

In one embodiment of the invention the control system is configured for controlling the removal of an oil phase out from the advanced sedimentation tank in dependence of an output from the at least one sensor in the advanced sedimentation tank after sedimentation of a sludge phase to a bottom part of the advanced sedimentation tank, said sludge phase comprising the separation aid together with impurities from the oil.

In one embodiment of the invention the control system is configured for controlling removal of a sludge phase from the advanced sedimentation tank through the at least one sludge phase outlet while monitoring an output from a sensor provided at substantially the same level as an oil phase outlet of the advanced sedimentation tank and stop the removal of a sludge phase when the output from the sensor indicates that an oil phase instead of a previous sludge phase is provided at the level of the oil phase outlet.

In one embodiment of the invention the method further comprises controlling removal of a sludge phase from the advanced sedimentation tank through at least one sludge phase outlet while monitoring an output from a sensor provided at substantially the same level as an oil phase outlet of the advanced sedimentation tank and stop the removal of a sludge phase when the output from the sensor indicates that an oil phase instead of a previous sludge phase is provided at the level of the oil phase outlet.

Hereby the position of an interphase between an oil phase and a sludge phase can be controlled and it can be assured that only oil phase is removed from the advanced sedimentation tank through the oil phase outlet.

In one embodiment of the invention said control system further being configured for controlling the system to:
  provide a separation aid and oil to be purified into the at least one basic sedimentation tank;
  after sedimentation of the separation aid together with impurities from the oil into a sludge phase to the bottom part of the basic sedimentation tank remove an oil phase from the basic sedimentation tank and transfer the sludge phase from the at least one basic sedimentation tank to the at least one advanced sedimentation tank;
  wait for allowing a sludge phase comprising separation aid together with impurities from the oil to sediment to a bottom part of the advanced sedimentation tank;
  detect by at least one sensor provided in the advanced sedimentation tank an oil phase or a sludge phase in the advanced sedimentation tank;
  remove an oil phase out from the advanced sedimentation tank in dependence of the sensor output.

In one embodiment of the invention the control system is further configured for controlling feeding of oil to be purified into at least two basic sedimentation tanks and removal of oil phase from the at least two basic sedimentation tanks such that one basic sedimentation tank is receiving new oil to be purified while the oil phase is removed from another basic sedimentation tank. Hereby oil to be purified can be continuously provided into the system and purified oil phase can continuously be removed out from the system. Hereby the system can be used as an online system for continuous purification of oil.

In one embodiment of the invention the system further comprises at least one product tank connected to the at least one oil phase outlet from the at least one basic sedimentation tank.

In one embodiment of the invention the system further comprises a filter module connected to the at least one oil phase outlet of the at least one basic sedimentation tank.

In one embodiment of the invention the method further comprises the step of filtering said oil phase removed from the at least one basic sedimentation tank for removing any possible remaining separation aid and impurities.

Herby any remaining impurities can be filtered.

In one embodiment of the invention the system further comprises a heating tank provided between the filter module and the at least one oil phase outlet of the at least one basic sedimentation tank.

In one embodiment of the invention the method further comprises the step of heating the oil phase removed from the at least one basic sedimentation tank before it is filtered.

Heating the oil can improve filtration effectivity.

In one embodiment of the invention the at least one advanced sedimentation tank comprises two sludge phase outlets provided at different levels in the bottom part of the advanced sedimentation tank, both connected to at least one sludge tank.

In one embodiment of the invention oil to be purified is provided into one of the basic sedimentation tanks while an oil phase is removed from another one of the basic sedimentation tanks.

DETAILED DESCRIPTION OF EMBODIMENT

Figure 1:
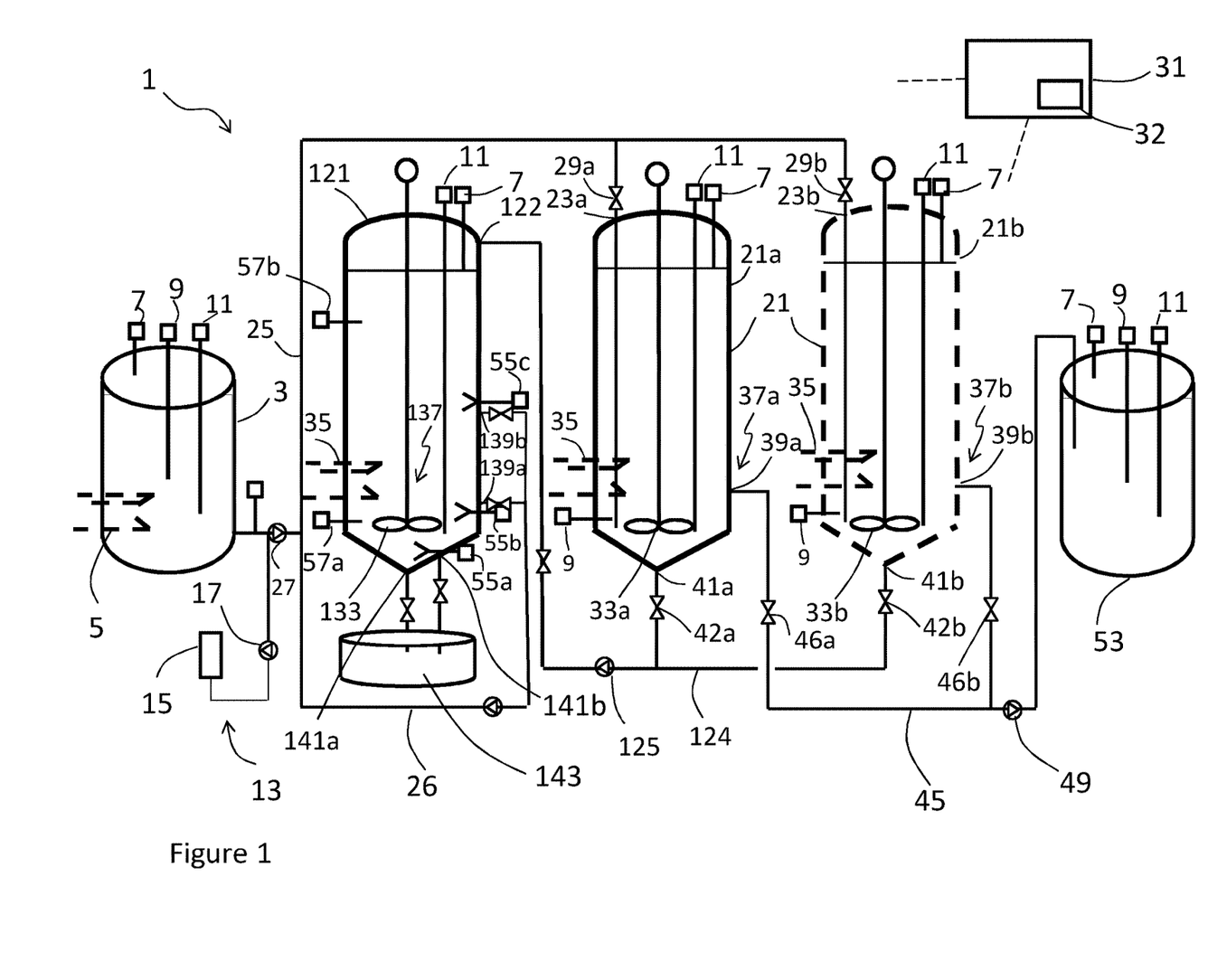
FIG. 1 shows schematically a system for purification of oil according to one embodiment of the invention.

FIG. 1 shows schematically a system 1 for purification of oil according to one embodiment of the invention. The system 1 comprises a feed tank 3 comprising oil to be purified. The system 1 could as well comprise more than one feed tank 3. The feed tank 3 can comprise a heating device 5 however this is not necessary. The feed tank 3 can also optionally comprise different sensors, such as here shown, a level switch 7, which will close an inlet to the feed tank and/or initiate an alarm when the content in the feed tank 3 has reached a certain level. Other sensors which optionally can be provided in the feed tank 3 are one or more temperature sensors 9, measuring the temperature of the content in the feed tank at one or more levels in the tank and a level sensor 11 which can detect to which level in the feed tank oil has been provided. The system 1 comprises further a separation aid dosing device 13 comprising a separation aid tank 15 and a separation aid pump 17. The use of a separation aid, also called a chemical booster, for capturing impurities in contaminated oil has been described before as discussed above. A liquid separation aid is added to the oil and mixed therewith and impurities in the oil will be captured by the separation aid and will accumulate in a bottom phase.

The separation aid will by chemical interactions absorb contaminating solids, or dissolved impurities in the contaminated target oil. The separation aid should be liquid at the temperature at which the process is carried out. The separation aid composition should be substantially insoluble in the contaminated target oil, forming a two-phase mixture upon mixing with the contaminated oil. The liquid separation aid should also have a density different from that of the contaminated oil to be purified.

The separation aid is not soluble in the contaminated target oil because of its polar properties and thus colloids consisting of small droplets of the liquid separation aid composition are formed by the stirring, which through chemical interactions (hydrophilic, hydrophobic, and charge interactions) may absorb unwanted solid or the dissolved impurities in the contaminated target oil. In instances where the separation aid has a higher density than the oil the separation aid will at a gravity separation form a lower phase together with the solid and/or dissolved impurities. In instances where the separation aid has a lower density than the contaminated target oil, it will form an upper phase on gravity separation.

The liquid separation aid for use in the invention will generally be made up based on the following components: a) a polar polymer; b) a hydrotrope/solubilizer; and, c) a co-tenside.

Suitable separation aids with the properties described above, that can be used in the inventive process, may e.g. constitute a composition comprising a mixture of polar polymers such as polyethylene glycols, polypropylene glycols or similar polyalkylene glycols, organic surface active components with nonionic, anionic, cationic and amphoteric properties with the ability to enhance the solubility of solid or dissolved impurities in to the separation aid.

One example of a separation aid which can be used in this invention comprise: a) at least one polar polymer not soluble in oil and with a higher density than the oil, such as polyethylene glycol with an average molecular weight of 190-210 g/mole, e.g. Carbowax PEG 200 (Dow Chemical Company); b) at least one surface active hydrotrope/solubilizer, such as anionic sulfonic acids, phosphate ester-based substances or non-ionic surfactants from the poly-glycoside family, such as Simulsol SL 4, Simulsol SL 7 G and Simulsol AS 48 (Seppic, Air Liquide group); c) at least one amphoteric Co-surfactant, such as an propionate type e.g. Ampholak YJH-40 (Akzo Nobel) which is a sodium caprylimino dipropionate.

The system 1 of the invention comprises further at least one basic sedimentation tank 21. In this embodiment of the invention two basic sedimentation tanks 21a, 21b are provided. One of the basic sedimentation tanks 21b in FIG. 1 is shown in dotted lines which illustrates that in another embodiment of the invention only one basic sedimentation tank is provided or more than two basic sedimentation tanks can be provided. The number of basic sedimentation tanks 21 will define the capacity of the system. Each of the basic sedimentation tanks 21a, 21b comprises at least one inlet 23a, 23b connected to the feed tank 3 and to the separation aid dosing device 13 by at least one fluid connection 25 for receiving oil to be purified and separation aid. Alternatively separate inlets and fluid connections for oil to be purified and separation aid into the basic sedimentation tanks 21a, 21b can be provided. A pump 27 is suitably provided in the fluid connection 25 for pumping oil and separation aid into the basic sedimentation tanks 21a, 21b. A valve 29a, 29b is also provided to the inlets 23a, 23b of the basic sedimentation tanks 21a, 21b for allowing control of which one of the basic sedimentation tanks 21a, 21b the fluid flow from the feed tank and the separation aid dosing device 13 should be provided to. A control system 31 is also provided in this embodiment of the system 1. The control system 31 is connected to pumps, valves and sensors in the system for allowing control of the system. The connections between the control system 31 and all the pumps, valves and sensors in the system are not shown. They are just illustrated by two dotted lines from the control system 31. The connections could be both wired connections or wireless connections. Further details of the control system will be given below.

Figure 2:
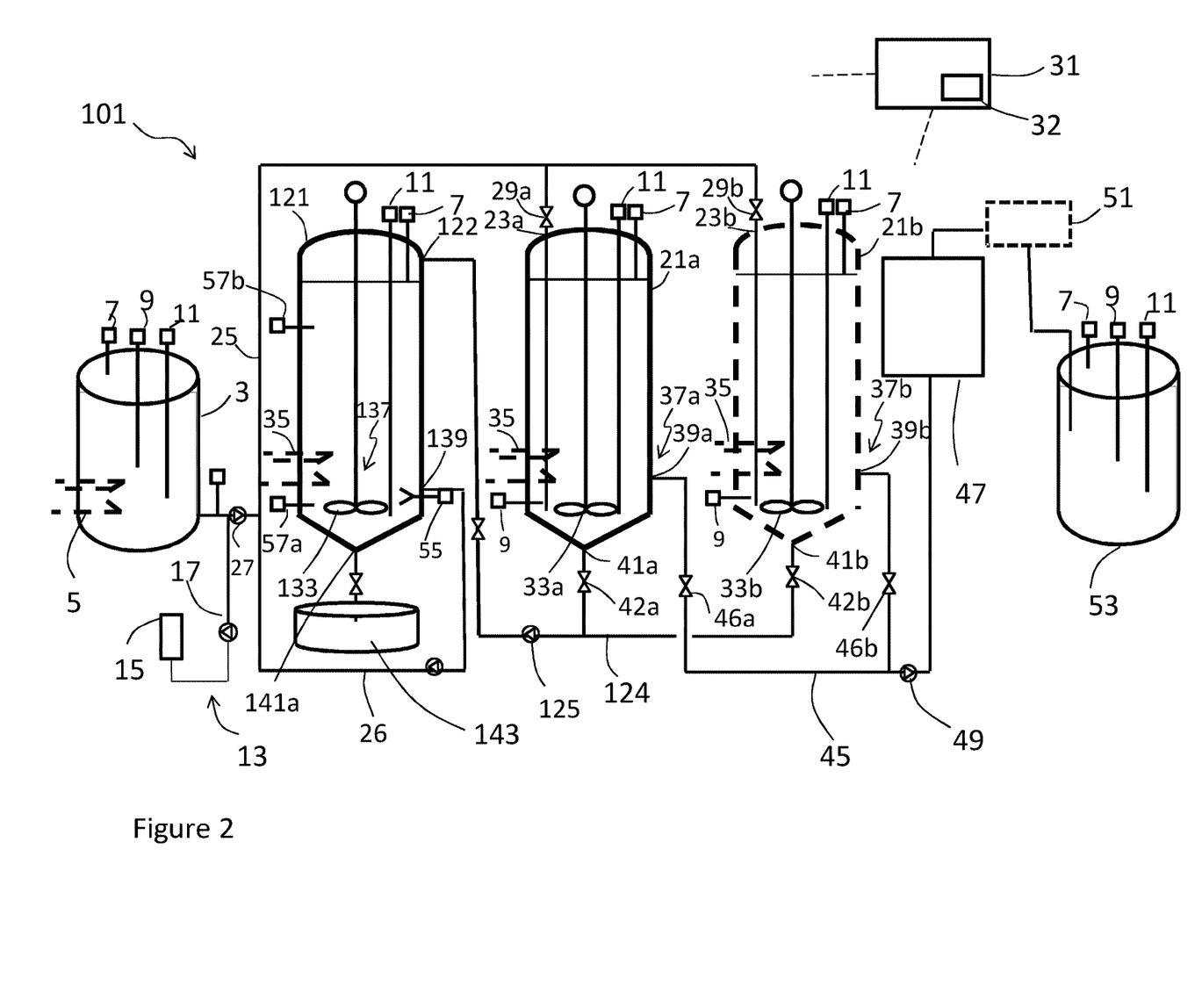
FIG. 2 shows schematically a system for purification of oil according to another embodiment of the invention.

Each basic sedimentation tank 21a, 21b further comprises at least one sludge phase outlet 41a, 41b provided in a bottom part 37a, 37b of the basic sedimentation tank 21a, 21b and at least one oil phase outlet 39a, 39b. In this embodiment said at least one oil phase outlet 39a, 39b in the at least one basic sedimentation tank 21a, 21b is provided at a position within the tank such that a certain percentage of the content in the tank can be removed from the basic sedimentation tank 21a, 21b through the oil phase outlet 39a, 39b leaving the rest of the content in a bottom part 37a, 37b of the basic sedimentation tank unaffected. The position of the oil phase outlet 39a, 39b is chosen such that no sludge phase will be removed from the basic sedimentation tank 21a, 21b through the oil phase outlet 39a, 39b. Hereby only the content in the tank provided above the level where the oil phase outlet 39a, 39b is positioned will be removed from the basic sedimentation tank through the oil phase outlet 39a, 39b and the position of the oil phase outlet can be chosen such that the sludge phase built up in the bottom part 37a, 37b of the tank never will be removed through the oil phase outlet. The oil phase outlets can be provided through the tank wall as indicated in FIGS. 1 and 2 or as suction pipes pointing down from the top of the tank to a certain level within the tank.

The sludge phase is instead removed from the basic sedimentation tank 21a, 21b through the sludge phase outlet 41a, 41b. The sludge phase is suitably removed from the basic sedimentation tank after the oil phase has been removed through the oil phase outlet 39a, 39b. However the method according to the invention will be further described below.

According to the invention the system 1 also comprises at least one advanced sedimentation tank 121. In the embodiment described in relation to FIG. 1 the system 1 comprises one advanced sedimentation tank 121. The advanced sedimentation tank 121 comprises at least one sludge phase inlet 122 which is connected by at least one fluid connection 124 to the at least one sludge phase outlet 41a, 41b of the at least one basic sedimentation tank 21a, 21b. In this embodiment the sludge phase outlets 41a, 41b from the two basic sedimentation tanks 21a, 21b are connected with the sludge phase inlet 122 of the advanced sedimentation tank 121 by the fluid connection 124. However, as pointed out above the number of basic sedimentation tanks may vary. In this embodiment of the invention valves 42a, 42b are provided to the sludge phase outlets 41a, 41b. These valves 42a, 42b are connected to the control system 31 and hereby it can be controlled from which one of the basic sedimentation tanks 21a, 21b sludge phase is transferred to the advanced sedimentation tank 121. The fluid connection 124 comprises also a pump 125 and possibly additional valves. In one embodiment of the invention the advanced sedimentation tank 121 comprises an inlet connected to the feed tank 3 and to the separation aid dosing device 13 for receiving oil to be purified and separation aid. However this is not necessary and is not shown in the embodiments of FIGS. 1 and 2. The advanced sedimentation tank is primarily used for treating the sludge phase received from the basic sedimentation tanks. The advanced sedimentation tank 121 comprises further at least one sludge removal outlet in a bottom part 137 of the advanced sedimentation tank 121. In the embodiment shown in FIG. 1 the advanced sedimentation tank 121 comprises two sludge removal outlets 141*a*, 141*b* provided at different levels in the bottom part 137 of the advanced sedimentation tank 121. The two sludge removal outlets 141*a*, 141*b* are both connected to a sludge tank 143. The use of two sludge removal outlets 141*a*, 141*b* provided at different levels of the tank allows a convenient way to be able to choose to either remove the whole sludge phase or to remove a part of the sludge phase and store a certain amount of sludge phase in the advanced sedimentation tank 121 for reuse in a next purification cycle. The separation aid in the sludge phase can often be reused for further purification and that is suitable for economic reasons. By providing one sludge removal outlet 141*b* at a level slightly above the lowest point of the tank a user can chose which part of the sludge he wants to keep in the tank for reuse. For example the heaviest fraction of the sludge can be kept in the tank while a lighter fraction of the sludge can be removed. The heaviest fraction of the sludge can possibly be the fraction best suitable for reuse. However, in another embodiment only one sludge removal outlet is provided, as can be seen in FIG. 2. In both the embodiment shown in FIG. 1 and the embodiment shown in FIG. 2 the advanced sedimentation tank 121 can be provided with only one sludge removal outlet 141*a*, two sludge removal outlets 141*a*, 141*b* or even more than two sludge removal outlets.

The advanced sedimentation tank 121 comprises also at least one oil phase outlet 139*a*, 139*b* for removing the oil phase from the advanced sedimentation tank 121 after sedimentation of the sludge phase to the bottom part 137 of the sedimentation tank 121. In the embodiment shown in FIG. 1 two oil phase outlets 139*a*, 139*b* are provided at different levels in the sedimentation tank 121. A valve, not numbered, is suitably also provided to each oil phase outlet 139*a*, 139*b*. However, also more than two oil phase outlets could be provided or only one. In the embodiment shown in FIG. 2 only one oil phase outlet 139 is shown however also in this embodiment another number of oil phase outlets could be provided. In that case the oil phase can be removed from the sedimentation tank from two or more different levels. In another embodiment the oil phase outlet is instead provided as one or more suction pipes pointing down from the top of the tank. A number of pipes of different lengths could be provided for the possibility to remove oil from different levels within the tank. Another possibility would be to provide a movable pipe which can be moved to different levels within the tank. However in the embodiment shown in FIG. 1 the oil phase outlets 139*a*, 139*b* are provided through the wall of the advanced sedimentation tank. The oil phase outlets 139*a*, 139*b* are here connected to the inlets 23*a*, 23*b* of the basic sedimentation tanks 21*a*, 21*b*. Hereby the oil phase removed from the advanced sedimentation tank will be treated again in a basic sedimentation tank 21*a*, 21*b* before transferred to a product tank. A fluid connection 26 connects in this embodiment the oil phase outlets 139*a*, 139*b* with the fluid connection 25 which is providing oil to be purified and separation aid to the basic sedimentation tanks 21*a*, 21*b*. In another embodiment however the oil phase removed from the advanced sedimentation tank 121 can be forwarded directly to a product tank.

Optionally the basic and/or the advanced sedimentation tanks 21*a*, 21*b*, 121 comprise a heating device 35. Herby the content in the tanks can be heated. The heating device 35 can for example be in the form of hot water tubes provided inside or outside the tank. The separation aid will capture impurities in the oil and form a phase together with the impurities called a sludge phase which will sink to a bottom part 37*a*, 37*b*, 137 of the basic and advanced sedimentation tanks 21*a*, 21*b*, 121. Hereby, by gravity settling two phases will be formed in the tanks 21*a*, 21*b*, 121 after some time, one oil phase and one sludge phase. Warming up the content in the tanks by the heating device 35 may improve separation efficiency. The heating devices are however not necessary for the invention.

Furthermore the advanced and basic sedimentation tanks 121, 21*a*, 21*b* suitably comprise mixing devices 133, 33*a*, 33*b*. The mixing devices 133, 33*a*, 33*b* comprise a motor and are suitably connected to the control system 31. Mixing the content in the sedimentation tanks is often suitable in order to improve separation effectivity.

The advanced sedimentation tank 121 comprises also at least one sensor 55; 55*a*, 55*b*, 55*c* for detecting the presence of an oil phase or a sludge phase in the advanced sedimentation tank 121. The oil phase is then removed from the advanced sedimentation tank in dependence of said detection. One or two of the at least one sensor 55; 55*b*, 55*c* can be provided at substantially the same level in the advanced sedimentation tank as one of the at least one oil phase outlets 139; 139*a*, 139*b* of the advanced sedimentation tank 121 and is configured for detecting if it is an oil phase or a sludge phase at this level in the advanced sedimentation tank.

In the embodiment shown in FIG. 1 the advanced sedimentation tank 121 comprises at least three sensors 55*a*, 55*b*, 55*c*, wherein one sensor 55*a* is provided at a position within the advanced sedimentation tank such that it will always be provided in the sludge phase, one sensor 55*b* is provided at substantially the same level within the advanced sedimentation tank as one of the oil phase outlets 139*a* and one sensor 55*c* is provided at a position within the advanced sedimentation tank 121 such that it will always be provided in the oil phase. Hereby the sensor output from the sensor 55*b* provided substantially at the same level as the oil phase outlet 139*a* can be compared with the output from the other two sensors 55*a*, 55*c* to know if there is an oil phase or a sludge phase at the position of that sensor 55*b*. If two or more oil phase outlets 139*a*, 139*b* are provided in the advanced sedimentation tank 121 as shown in FIG. 1, the sensor 55*c* can be provided at substantially the same level as one of the oil phase outlets 139*b*. However the number of sensors, the number of oil phase outlets and their relative positions can be varied within the scope of the invention. Another possibility, which is shown in FIG. 2, would be to provide only one sensor 55 at substantially the same level as an oil phase outlet 139 and compare the sensor output with beforehand known values for such sensor output when provided in oil phase and in sludge phase. The sensors 55; 55*a*, 55*b*, 55*c* could for example be based on measuring dielectric properties or density properties of the content.

The sensor 55 could in another embodiment instead be for example a guided wave radar, which is a long wire attached to the top of the tank, hanging inside the tank almost all the way down to the bottom of the tank. Such a guided wave radar can provide information about where an interface between two phases are located by comparing reflected microwave pulses which will differ when the wire is provided in different environments. If the oil phase outlet is provided as a movable tube provided from the top of the tank the movable tube could be controlled in dependence of the detected interphase level for removing the oil phase from that level.

The control system 31 of the system 1 is configured for controlling the removing of the oil phase form the advanced sedimentation tank 121 in dependence of said detection by the sensors 55; 55a, 55b, 55c. If a sensor 55; 55b which is provided substantially at the same level as the oil phase outlet 139a; 139 initially indicates the presence of sludge phase the control system 31 in one embodiment of the invention first controls the system to remove sludge from the advanced sedimentation tank 121 through one of the at least one sludge phase outlets 141a, 141b while at the same time the control system is monitoring an output from the sensor 55, 55b which is provided at substantially the same level as the oil phase outlet 139a; 139. Sludge should then be removed until the sensor output changes and indicates that an oil phase is provided at substantially the level of the oil phase outlet 139a; 139. At this point the sludge removal is paused and oil phase is instead removed through the oil phase outlet 139a; 139.

The advanced sedimentation tank 121 comprises further in this embodiment at least one temperature sensor 57a, 57b. In the embodiment of FIG. 1 two temperature sensors 57a, 57b are shown positioned at different levels within the advanced sedimentation tank 121. However another number of temperature sensors could as well be provided. The control system 31 can be connected to both the temperature sensors 57a, 57b and the heating device 35 in the advanced sedimentation tank 121 hereby allowing control of the heating device 35 and heating of the content in the sedimentation tank in dependence of the temperature(s) measured by the at least one temperature sensor 57a, 57b. By providing temperature sensors at different levels inside the sedimentation tank 21 the heating of the tank content can be optimized and a uniform temperature can be provided to all the content in the tank. Furthermore sensor outputs can be adjusted in dependence of measured temperatures.

In the embodiment shown in FIG. 1 a product tank 53 is also provided. The product tank 53 is connected to the at least one oil phase outlet 39a, 39b from the at least one basic sedimentation tank 21a, 21b by a fluid connection 45 with branches into each oil phase outlet 39a, 39b. At least one pump 49 is provided in the fluid connection 45 and valves 46a, 46b are provided in each of the fluid branches into the oil phase outlets 39a, 39b in order to allow for control of the fluid between the basic sedimentation tanks 21a, 21b and the product tank 53. The control system 31 is hereby suitably connected to the pump 49 and the valves 461, 46b of the fluid connection 45 between the oil phase outlets 39a, 39b and the product tank 53. The control system 31 can hereby control from which of the basic sedimentation tanks 21a, 21b an oil phase should be removed. In a system comprising at least two basic sedimentation tanks 21a, 21b the control system 31 is configured for controlling feeding of oil to be purified into the at least two basic sedimentation tank 21a, 21b and removal of oil phase from the at least two basic sedimentation tanks 21a, 21b such that one basic sedimentation tank 21a, 21b is receiving new oil to be purified while the oil phase is removed from another basic sedimentation tank 21a, 21b. Hereby oil to be purified can be continuously provided into the system and purified oil phase can continuously be removed out from the system 1. Hereby the system 1 can be used as an online system for continuous purification of oil, i.e. oil to be purified can be continuously provided to the feed tank 3 and purified oil can be continuously retrieved form the product tank 53 and the system 1 can be connected in a process where oil continuously is used and continuously needs to be purified. Hereby the oil levels in a system which is connected to the system for purification of oil according to the invention can be kept at a constant level during the oil purification process.

The product tank 53 can comprise similar sensors as the feed tank 3, such as a level switch 7, a temperature sensor 9 and a level sensor 11. However, these sensors are not necessary for the invention. Also both the advanced and basic sedimentation tanks 21a, 21b, 121 can comprise a level switch 7 and a level sensor 11. Temperature sensors 57a, 57b have already been described in the advanced sedimentation tank 121 however one or more temperature sensors 9 can optionally also be provided in the basic sedimentation tanks 21a, 21b.

The control system 31 is connected to sensors, pumps and valves in the system 1 and is configured for controlling flows in the system 1 in dependence of sensor signals, predefined settings and possibly also user input. The control system 31 is configured for controlling feeding of oil to be purified from the feed tank 3 to the at least one basic sedimentation tank 21a, 21b in a cyclic order if more than one basic sedimentation tanks are provided. Separation aid is also provided together with the oil to be purified from the separation aid dosing device 13. The control system 31 is further configured for controlling a removal of an oil phase from the at least one basic sedimentation tank 21a, 21b after sedimentation of a sludge phase to a bottom part 37a, 37b of the basic sedimentation tank 21a, 21b. The sludge phase comprises the separation aid together with impurities from the oil and the control system 31 is further configured for controlling transfer of the rest of the content in the basic sedimentation tank 21a, 21b comprising the sludge phase and possibly some of the oil phase to the at least one advanced sedimentation tank 121.

Furthermore the control system 31 is configured for controlling the removal of an oil phase out from the advanced sedimentation tank 121 in dependence of a sensor output from at least one sensor 55; 55a, 55b, 55c provided in the advanced sedimentation tank 121 after sedimentation of a sludge phase to a bottom part 137 of the advanced sedimentation tank 121.

The sludge phase comprises the separation aid together with impurities from the oil. Said at least one sensor 55; 55a, 55b, 55c detects the presence of an oil phase or a sludge phase in at least one position in the advanced sedimentation tank 121.

Hereby the control system 31 is in this embodiment configured for controlling the system 1 to:
provide a separation aid and oil to be purified into the at least one basic sedimentation tank 21a, 21b;
after sedimentation of the separation aid together with impurities from the oil into a sludge phase to the bottom part 37a, 37b of the basic sedimentation tank 21a, 21b remove an oil phase out from the basic sedimentation tank and transfer the sludge phase from the at least one basic sedimentation tank 21a, 21b to the at least one advanced sedimentation tank 121;
waiting and possibly mixing for allowing a sludge phase comprising separation aid together with impurities from the oil to sediment to a bottom part 137 of the advanced sedimentation tank 121;
detect by at least one sensor 55; 55a, 55b, 55c provided in the advanced sedimentation tank 121 an oil phase or a sludge phase in at least one position in the advanced sedimentation tank;

remove an oil phase out from the advanced sedimentation tank 121 in dependence of the sensor output.

FIG. 2 shows schematically a system 101 for purification of oil according to another embodiment of the invention. There are only a few differences from the embodiment described in relation to FIG. 1. One of them is that a filter module 51 and a heating tank 47 are provided in the fluid connection 45 between the oil phase outlets 39a, 39b and the product tank 53. Such a filter module 51 and heating tank 47 could also be provided to the embodiment described in relation to FIG. 1. Another difference is that only one sludge phase outlet 141 is provided in the bottom part 137 of the advanced sedimentation tank 121. However also in this embodiment more than one sludge phase outlet 141 could be provided. Furthermore only one oil phase outlet 139 is provided to the advanced sedimentation tank 121 and only one sensor 55 for detecting the presence of an oil phase or a sludge phase. However, also in this embodiment more than one oil phase outlets can be provided in the advanced sedimentation tank as described above in relation to FIG. 1 and more than one sensor 55a, 55b, 55c can be provided at different levels within the tank. The sensor 55 is in this embodiment provided at substantially the same level as the oil phase outlet 139 and the control system 31 has been provided with comparing values for sensor outputs when this type of sensor is provided in oil phase and in sludge phase. All the other details are exactly the same as in the previously described embodiment and are also given the same reference numbers and will not be described again. By the inclusion of a filter module 51 possible remaining impurities and separation aid in the oil phase removed from the basic sedimentation tanks 21a, 21b can be filtered out by the filter module 51. The product tank 53 hereby receives the oil phase from the basic sedimentation tanks 21a, 21b after it has been filtered in the filter module 51. Any possible remaining impurities and separation aid in the oil phase will be kept in the filter module 51. In this embodiment of the invention a heating tank 47 is also provided in the fluid connection 45 between the oil phase outlets 39a, 39b and the filter module 51. The heating tank 47 is not necessary for the invention but heating the oil phase before the filtration may improve filtration efficiency. The filter module 51 can comprise for example a capillary filter, a standard filter, for example based on paper and having different filtration grades and/or a water absorbent filter. Oil will pass through the filter but separation aid and impurities will get trapped by the filter.

Figure 3:
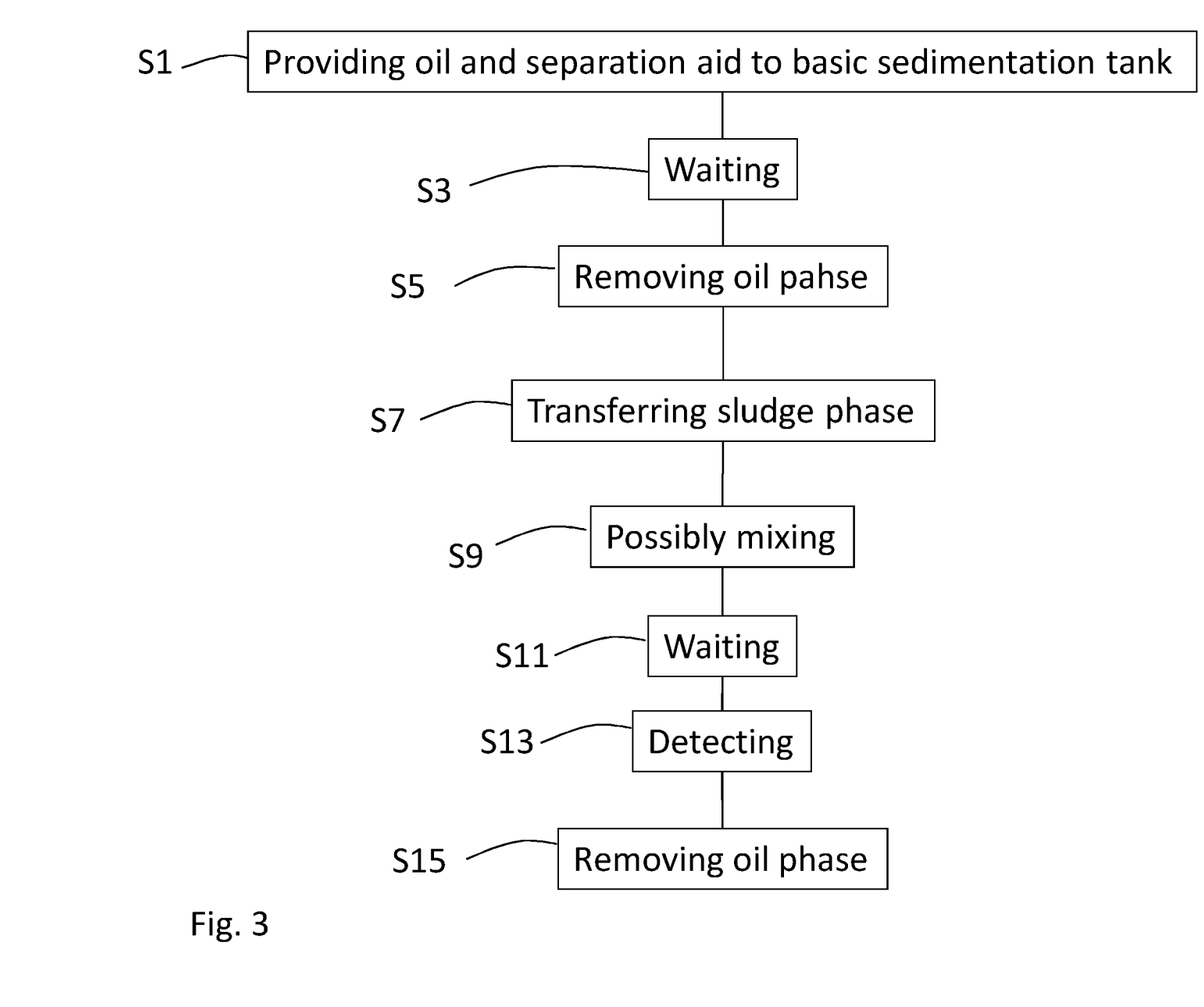
FIG. 3 is a flow chart of the method according to one embodiment of the invention.

FIG. 3 is a flow chart of a method for purification of oil in a system 1; 101 comprising at least one basic sedimentation tank 21a, 21b and at least one advanced sedimentation tank 121 according to one embodiment of the invention. The method steps are described in order below:

S1: Providing separation aid and oil to be purified to at least one basic sedimentation tank 21a, 21b. In the embodiments described in relation to FIGS. 1 and 2 two basic sedimentation tanks 21a, 21b are provided in the system 1; 101 however any other number of basic sedimentation tanks could be provided. If two or more basic sedimentation tanks are provided in the system the separation aid and oil to be purified can be provided to the basic sedimentation tanks in a cyclic order, i.e. first to one of them and after that to another of them and so on and finally returning for providing new separation aid and oil to be purified to the first basic sedimentation tank again. However that would be when the first basic sedimentation tank has been emptied after a sludge phase and an oil phase has been built up in the tank—see further steps S3-S7 below.

S3: Waiting for allowing a sludge phase to sediment to a bottom part 37a, 37b of the basic sedimentation tank 21a, 21b. Said sludge phase comprising the separation aid and impurities from the oil.

S5: Removing the oil phase from the basic sedimentation tank 21a, 21b through an oil phase outlet 39a, 39b. In one embodiment of the invention the oil phase is transferred from the basic sedimentation tank 21a, 21b to a product tank 53 through a fluid connection 45. Furthermore in the embodiment described in relation to FIG. 2 the oil phase is filtered in a filter module 51 on its way to the product tank 53 for removing any possible remaining separation aid and impurities. The removed oil phase is possibly also heated in a heating tank 47 before the filtering. In one embodiment of the invention the removing of the oil phase from the basic sedimentation tank 21a, 21b comprises removing a certain percentage of the content in the tank from the basic sedimentation tank leaving the rest of the content in a bottom part 37a, 37b of the basic sedimentation tank unaffected, whereby no sludge phase will be removed from the basic sedimentation tank through the oil phase outlet 39a, 39b together with the removed oil phase.

S7: Transferring the content left in a bottom part 37a, 37b of the basic sedimentation tank 21a, 21b when the oil phase has been removed in step S5 from the basic sedimentation tank 21a, 21b to the at least one advanced sedimentation tank 121. The content left in the bottom part of the basic sedimentation tank 21a, 21b is the content provided below a position of the oil phase outlet 39a, 39b and comprises the sludge phase and possibly some oil phase. The oil phase outlets 39a, 39b of the basic sedimentation tanks 21a, 21b are provided in a position such that it is guaranteed that no or a minimum of sludge phase will be removed from the basic sedimentation tank 21a, 21b through the oil phase outlet 39a, 39b.

S9: Possibly mixing the content in the advanced sedimentation tank 121.

S11: Waiting for allowing a sludge phase to sediment to a bottom part 137 of the advanced sedimentation tank 121. Said sludge phase comprising the separation aid and impurities from the oil.

S13: Detecting an oil phase or a sludge phase in at least one position in the advanced sedimentation tank 121. At least one sensor 55; 55a, 55b, 55c as described above can be used.

S15: Removing the oil phase from the advanced sedimentation tank 121 in dependence of the detection/sensor output received in S13.

The step of detecting comprises in one embodiment of the invention detecting if it is an oil phase or a sludge phase at substantially the level in the advanced sedimentation tank where an oil phase outlet 139a, 139b; 139 is provided.

Suitably at least a part of the sludge phase is transferred from the advanced sedimentation tank 121 to a sludge tank 143. As described above a part of the sludge phase can be stored in the advanced sedimentation tank for reuse of the separation aid in the sludge phase.

In one embodiment of the invention the method further comprises controlling removal of a sludge phase from the advanced sedimentation tank 121 through at least one sludge phase outlet 141; 141a, 141b while monitoring an output from a sensor 55; 55b provided at substantially the same level as an oil phase outlet 139a; 139 of the advanced sedimentation tank 121 and stop the removal of a sludge phase when the output from the sensor 55; 55b indicates that an oil phase instead of a previous sludge phase is provided at the level of the oil phase outlet 139a; 139. The sludge removal is then paused while the oil phase instead is removed from the advanced sedimentation tank 121 through the oil phase outlet 139*a;* 139. After the oil phase has been removed more sludge phase can be removed. Hereby, by removing sludge phase while monitoring the sensor output the level of an interphase between an oil phase and a sludge phase can be controlled to be provided at the same level as the oil phase outlet before a removing of an oil phase is started. Hereby substantially the whole oil phase can be removed from the advanced sedimentation tank in a convenient way and very little oil will be wasted. Suitably the oil phase outlet 139*a*, 139 is provided just above the sensor 55*b;* 55.

In one embodiment of the invention a method is provided wherein oil to be purified is provided into one of the basic sedimentation tanks 21*a*, 21*b* while an oil phase is removed from another one of the basic sedimentation tanks.

A computer program product is furthermore provided comprising instructions which, when executed in a processor 32 in the control system 31 in the system 1; 101 for purification of oil, cause the control system 31 to perform the above described method.

The invention claimed is:

1. A system for purification of oil, said system comprising:
   a feed tank comprising oil to be purified;
   a separation aid dosing device;
   a first basic sedimentation tank comprising at least one inlet connected to the feed tank and to the separation aid dosing device for receiving oil to be purified and a separation aid, said basic sedimentation tank further comprising a sludge phase outlet by provided in a bottom part of the basic sedimentation tank and an oil phase outlet; and
   an advanced sedimentation tank comprising a sludge phase inlet connected to the sludge phase outlet of the basic sedimentation tank,
   said advanced sedimentation tank further comprising a sludge phase outlet connected to a sludge tank and an oil phase outlet,
   wherein said advanced sedimentation tank further comprises a first sensor for detecting presence of an oil phase or a sludge phase, and
   a control system configured for controlling removal of an oil phase from the advanced sedimentation tank depending on an output from the sensor in the advanced sedimentation tank, with sedimentation of the sludge phase in a bottom part of the advanced sedimentation tank resulting in detection of the oil phase at a certain level within said advanced sedimentation tank by said sensor, said sludge phase comprising the separation aid together with impurities from the oil.

2. A system according to claim 1, wherein said a sensor is provided at substantially a level in the advanced sedimentation tank at which said oil phase outlet is located in ef-the advanced sedimentation tank and is configured for detecting an oil phase or a sludge phase at said level in the advanced sedimentation tank.

3. A system according to claim 1, wherein the advanced sedimentation tank comprises three sensors including the first sensor, wherein
   one sensor of said sensors is positioned within the advanced sedimentation tank to always be located in the sludge phase,
   the first sensor is positioned at substantially a level within the advanced sedimentation tank at which the oil phase outlet is located in the advanced sedimentation tank, and
   one sensor of said sensors is positioned to always be located in the oil phase.

4. A system according to claim 1, wherein said oil phase outlet in the basic sedimentation tank is positioned such that substantially no sludge will be removed from the basic sedimentation tank through the oil phase outlet.

5. A system for purification of oil according to claim 1, wherein said control system is also configured for controlling removal of the oil phase from the basic sedimentation tank after sedimentation of the sludge phase in a bottom part of the basic sedimentation tank, said sludge phase comprising the separation aid together with impurities from the oil,
   said control system further being configured for controlling transfer of the sludge phase in the basic sedimentation tank to the advanced sedimentation tank.

6. A system according to claim 5, wherein the control system is configured for controlling removal of the sludge phase from the advanced sedimentation tank through the sludge phase outlet while monitoring output from the sensor provided at substantially a level at which the oil phase outlet is located in the advanced sedimentation tank and stop removal of the sludge phase when the output from the sensor indicates an oil phase instead of the sludge phase is at the level of the oil phase outlet.

7. A system according to claim 5, wherein said control system is further configured for controlling the system to:
   provide the separation aid and oil to be purified into the basic sedimentation tank;
   after sedimentation of the separation aid together with impurities from the oil into the sludge phase at the bottom part of the basic sedimentation tank remove the oil phase from the basic sedimentation tank and transfer the sludge phase from the basic sedimentation tank to the advanced sedimentation tank;
   allow a sludge phase comprising the separation aid together with impurities from the oil to sediment in the bottom part of the advanced sedimentation tank;
   detect by the sensor provided in the advanced sedimentation tank an oil phase or a sludge phase in the advanced sedimentation tank; and
   remove an oil phase out from the advanced sedimentation tank depending on the sensor detection.

8. A system for purification of oil according to claim 5, wherein the control system is further configured for controlling feeding of the oil to be purified into the first basic sedimentation tank and a second basic sedimentation tank and removal of oil phase from the two basic sedimentation tanks such that one basic sedimentation tank receives new oil to be purified while the oil phase is being removed from the other another basic sedimentation tank.

9. A system according to claim 1, further comprising:
   a product tank connected to the oil phase outlet from the basic sedimentation tank.

10. A system according to claim 1, further comprising a filter module connected to the oil phase outlet of the basic sedimentation tank.

11. A system according to claim 10, further comprising a heating tank provided between the filter module and the oil phase outlet of the basic sedimentation tank.

12. A system according to claim 1, wherein the advanced sedimentation tank comprises two sludge phase outlets provided at different levels in the bottom part of the advanced sedimentation tank, and both connected to the sludge tank.

13. A method for purification of oil in a system comprising a first basic sedimentation tank and an advanced sedimentation tank, said method comprising:
providing a separation aid and oil to be purified to the basic sedimentation tank;
for allowing a sludge phase to sediment in a bottom part of the basic sedimentation tank, said sludge phase comprising the separation aid and impurities from the oil;
removing the oil phase from the basic sedimentation tank;
transferring the sludge phase from the basic sedimentation tank to the advanced sedimentation tank;
allowing a sludge phase to sediment in a bottom part of the advanced sedimentation tank, said sludge phase comprising the separation aid and impurities from the oil;
detecting by a sensor provided in the advanced sedimentation tank, the presence of an oil phase or a sludge phase in a position in the advanced sedimentation tank; and
removing the oil phase from the advanced sedimentation tank depending on the detection of the oil phase at a certain level within said advanced sedimentation tank by the sensor.

14. A method according to claim 13, wherein the step of detecting comprises detecting an oil phase or a sludge phase at substantially a level in the advanced sedimentation tank where an oil phase outlet is provided.

15. A method according to claim 13, wherein the step of removing the oil phase from the basic sedimentation tank comprises removing a portion of content in the basic sedimentation tank, and leaving a remaining portion of the content in the bottom part of the basic sedimentation tank unaffected, whereby substantially no sludge removed from the basic sedimentation tank together with the removed oil phase.

16. A method according to claim 13, wherein the method further comprises
controlling a removal of the sludge phase from the advanced sedimentation tank through a sludge phase outlet while monitoring an output from the sensor provided at substantially a level at which an oil phase outlet is located in the advanced sedimentation tank, and
stopping the removal of the sludge phase when the output from the sensor indicates an oil phase instead of the sludge phase is at the level of the oil phase outlet.

17. A method according to claim 13, further comprising the step of filtering said oil phase removed from the basic sedimentation tank for removing any possible remaining separation aid and impurities.

18. A method according to claim 17, further comprising the step of heating the oil phase removed from the basic sedimentation tank before it is filtered.

19. A method according to claim 13, wherein the system comprises two basic sedimentation tanks including the first basic sedimentation tank, and
oil to be purified is provided into one of the basic sedimentation tanks while an oil phase is removed from the other of the basic sedimentation tanks.

* * * * *